April 28, 1953  A. BASSOT ET AL  2,636,967
GAS-SHIELDED ELECTRODE HOLDER FOR ARC WELDING TORCHES
Filed July 14, 1949  2 SHEETS—SHEET 1
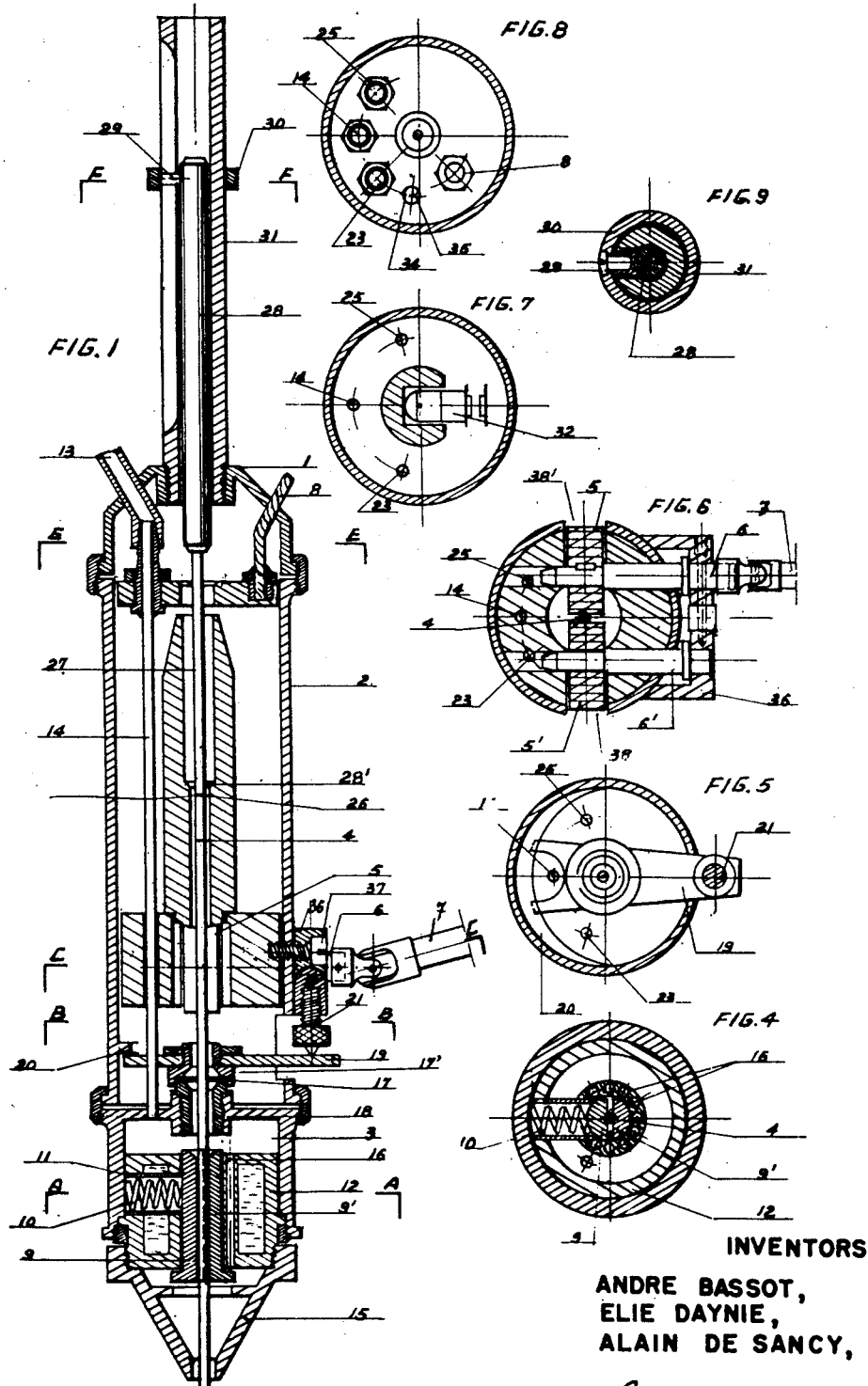
INVENTORS
ANDRE BASSOT,
ELIE DAYNIE,
ALAIN DE SANCY,
BY Stone, Boyden & Mack.
ATTORNEYS

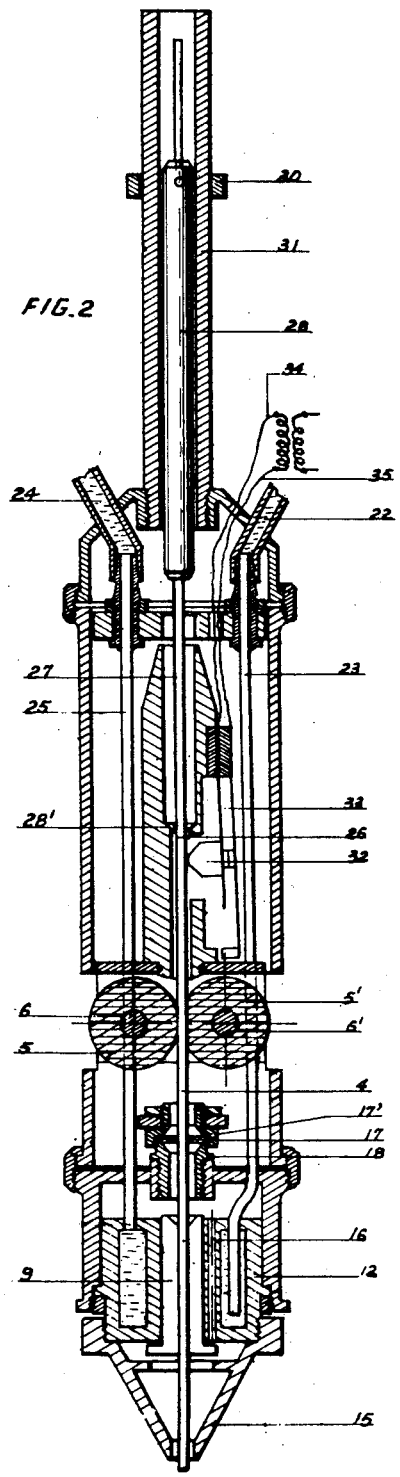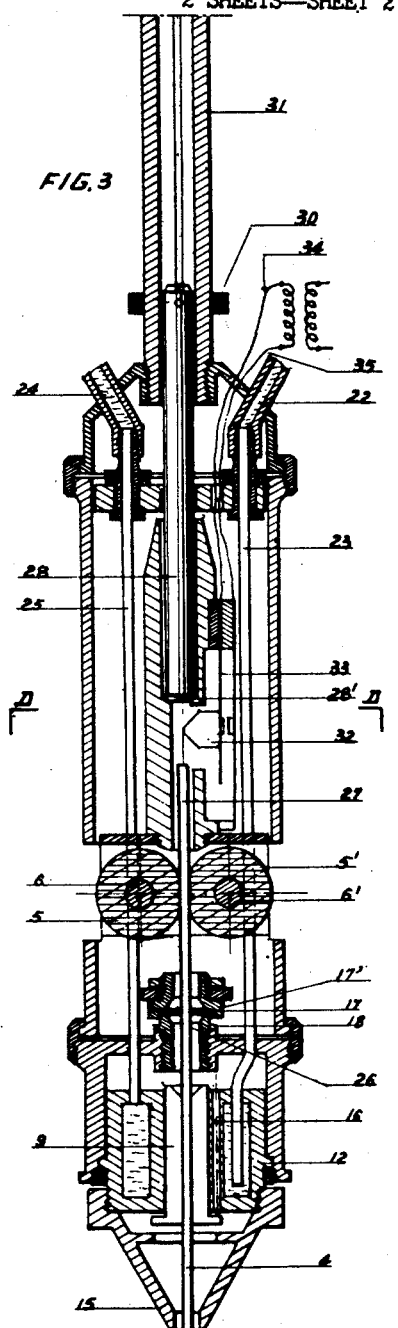
INVENTORS
ANDRE BASSOT,
ELIE DAYNIE,
ALAIN DE SANCY,
BY Stone, Boyden & Mack.
ATTORNEYS Patented Apr. 28, 1953

2,636,967

UNITED STATES PATENT OFFICE 2,636,967

GAS-SHIELDED ELECTRODE HOLDER FOR ARC WELDING TORCHES

André Bassot, Boulogne-sur-Seine, Elie Daynié, Neuilly-sur-Seine, and Alain de Sancy, Paris, France, assignors to L'Air Liquide, Societe Anonyme Pour l'Etude et l'Exploitation des Procedes Georges Claude, Paris, France Application July 14, 1949, Serial No. 104,674
In France July 29, 1948

5 Claims. (Cl. 219—8)

Our invention deals with a device for the electrodes of refractory metal, tungsten as a rule, for the arc-welding semi-automatic torches in an atmosphere of inert protective gas, such as argon, helium, krypton, etc., or mixtures of these. Although known as "non-consumable," this electrode wears away during the welding, slowly it is true, and in order to keep the length of the arc invariable, it is necessary to feed it to the work in proportion to its wearing away. For this purpose, it has been the custom up to now for the torch body itself carrying the electrode to be advanced toward the work without altering the position of the electrode relatively to the torch body, so that the distance between the end of the electrode and the end of the torch, from where it comes into view, lessened gradually. Now, it has been established that the welding operation was disturbed by this, probably on account of the change thus brought in the flow conditions of the shield gas issuing from the torch round the end of the electrode where arcing-over takes place.

One object of the invention is to provide a torch in which it is possible to advance the electrode relatively to the torch body similarly to the conventional arrangement used in case the electrode is consumable, the distance of the torch body itself to the work remaining thus unchanged.

Another object is to provide at the end of the torch, towards the work, a chamber containing the inert gas, the cooling liquid, the current contact pieces with the electrode and the necessary connections for the inlets of gas, of cooling liquid and of current, and for the outlet of cooling liquid.

Another object is to provide, for the passage of the electrode into the above mentioned gas chamber, a gas tight joint which is easily replaceable, specially according to the different diameters of the electrodes.

Another object is to provide a torch of the kind in which no external connections or pipes exist except at the end opposite to the work.

Other objects will appear from the following description.

In the accompanying drawings that illustrate, as an example, an embodiment of the invention, Figure 1 is a vertical section through the axis of the torch, the electrode being comparatively unworn; Figure 2 is a vertical section through the axis of the torch; Figure 3 is a section similar to the previous one illustrating the electrode worn away to a great extent; Figures 4, 5, 6, 8 and 9 are horizontal sections respectively along the lines AA, BB, CC, EE, and FF of Figure 1 and Figure 7 is a section along the line DD of Figure 3.

The body of the torch, of which the general shape is that of a cylinder, is formed by the three following parts of insulating material, that are set up over each other: the cap-piece 1, the barrel 2 and the gas chamber 3. The electrode 4 passes between two rollers 5 and 5' of which the first is keyed on the spindle 6 that may be set in rotation by a remotely-controlled hinged rod 7, while the other is loose on its spindle 6'; these rollers are of flexible rubber, which enables electrodes of all the diameters met with in practice to pass without having to change the spacing apart of the spindles. The spindles 6 and 6' (see Figure 6) are provided with a small collar pressing against the clamp 36 and preventing them going outside. The clamp 36 is held only by a single screw 37. The removal of this screw enables the partial or complete withdrawal to be effected of the two spindles 6 and 6' and, consequently, the removal and quick changing of the rollers that fall out through the side openings 38 and 38' of the body of the apparatus. The spindles 6 and 6' may be ended off at the side of their ends set on the rollers by a tapered portion. This arrangement allows, when setting up, the easy entry of the spindles into the rollers notwithstanding the divergence of the distance between the spindles due to the required initial compression of the elastic packings of the rollers. The tapering entry may be made without discrimination on the spindles, the rollers or on these parts as a whole. The welding current that enters at 8 is conveyed to the electrode through the two bushings 9 and 9' pressed close together against each other by the spring 10 that goes inside a tube 11 through the water-circulation casing 12 surrounding the current-collecting bushings; the cooling water coming in at 22 is led to the casing 12 through the tube 23 and leaves at 24 through the tube 25. The protective gas coming in at 13 is led through the tube 14 into the gas chamber 3 from where it goes into the nozzle 15, preferably of ceramic material, by going through holes 16 cut in the water-circulation casing 12. The gastightness of the gas chamber is ensured by the rubber washer 17 that caps the seating 18 through the peripheral raised edge of the insulating support 17' in which it is set, and that is perforated in its centre with a hole slightly smaller than the diameter of the electrode that goes through it. This washer, that is changed at each alteration of electrode diameter, is pressed on its seating by means of the blade 19 that acts as a lever of the second class (that in which the resistance is between the power and the fulcrum) by bearing under a raised edge 20 provided inside the barrel 2 and being pressed through the rotary movement of the milled screw 21. The electrode, that is joined preferably through brazing at 26 to an extension-piece of the same diameter made of brass 27 so as to enable use to be made of it until its almost complete wearing away, is in contact, through this extension-piece, with a piston 28 that presses above through its own weight and on which is fastened by means of a screw 29 a ring 30 that may slide freely outside the protecting sleeve 31 surrounding the piston 28, the screw 29 going through a longitudinal slot cut in the sleeve. This ring forms a sight-pointer for the operator located at any point of the machine and it shows at each moment the wearing-away stage of the electrode; the downward travel of the piston 28 is restricted by the shoulder 28'. When the electrode is worn away to a great extent (Figures 3 and 7) the contact member 32 that was pressed on it or on its extension-piece through the blade spring 33 is disengaged and cuts the auxiliary circuit 34, 35, that, through a relay, switches off the welding current.

The operation of the rod 7 with remote control of the rotation of the rollers may be carried out by hand or automatically, by means of electronic devices for instance influenced by a photo-electric cell receiving the light from the point of the electrode.

What we claim is:

1. In an inert gas-shielded arc-welding torch with an electrode of refractory metal, a gas chamber at the end of the torch and terminated at one end by a gas outlet around the electrode, a washer on a seat in said chamber at its other end, this washer being centrally perforated by a hole slightly smaller than the diameter of the electrode and being pressed on the seat by a metallic ring integral with a blade acting as a lever for jamming the washer on its seat, the fulcrum of the lever being an internal projection of the torch wall and the powering means on the lever being external to the torch body.

2. In an inert gas-shielded arc-welding torch with an electrode of refractory metal, a gas chamber at the end of the torch and terminated at one end by a gas outlet around the electrode, a hollow metallic annulus member having spaced inner and outer walls which outer wall is in contact with the wall of said gas chamber and spaced concentrically with respect to said electrode and resting within said gas chamber and adapted to receive electrode cooling fluid, said annulus member being electrically connected to a welding current supply terminal, two withdrawable welding current collecting bushings arranged concentrically with respect to said annulus member and surrounded thereby and being in spring-pressed contact with said electrode which passes through said bushings, an annular series of spaced ports piercing said annulus member and arranged in parallel relation with said current collecting bushings and lying substantially adjacent thereto, said annulus member being so arranged in said gas chamber that a space is formed between said annulus member and that end of the gas chamber remote from the torch end, there being a gas tight joint at that remote end through which the electrode is adapted to pass, said series of ports serving to permit the shielding gas to pass through the annulus member and external to the bushings to the gas outlet around the electrode.

3. The combination claimed in claim 3 wherein said spring-pressed means consists of a spring confined within a tube which tube extends through said annulus member and through said outer wall and said inner wall, said spring being in contact with the torch body wall of said gas chamber and one of said bushings at all times.

4. The combination claimed in claim 2 having above said gas chamber two rollers engaging the electrode, said rollers when actuated serving to advance the electrode through said gas chamber, at least the peripheries of said rollers being furnished with elastic material, actuating means for said rollers, a spindle carrying each roller, a clamp holding these two spindles in working position and fixed with a single screw on the torch body, and openings in said torch body for disengaging the rollers therefrom.

5. The combination claimed in claim 2 having inside the torch body a pipe conducting the shield gas and running from the upper end of the torch to the lower end whereat the gas chamber is arranged, and pipes within said torch body electrically connected to said annulus wherein the cooling fluid circulates to and from said annulus from a source external to said torch body.

ANDRÉ BASSOT.
ELIE DAYNIÉ.
ALAIN DE SANCY.

References Cited in the file of this patent

UNITED STATES PATENTS

| Number | Name | Date |
|---|---|---|
| 1,493,440 | Stresau | May 6, 1924 |
| 1,498,167 | Hill | June 17, 1924 |
| 1,707,433 | Hand | Apr. 2, 1929 |
| 2,271,723 | Trainer | Feb. 3, 1942 |
| 2,272,158 | Anderson | Feb. 3, 1942 |
| 2,280,628 | Chapman | Apr. 21, 1942 |
| 2,327,929 | Quigley | Aug. 24, 1943 |